(12) United States Patent
Wu et al.

(10) Patent No.: US 8,767,669 B2
(45) Date of Patent: Jul. 1, 2014

(54) METHOD TO ENHANCE DISCOVERY OF IDENTIFIERS MULTIPLEXED IN A PEER-TO-PEER CHANNEL

(75) Inventors: Zhibin Wu, Bedminster, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 12/897,133

(22) Filed: Oct. 4, 2010

(65) Prior Publication Data

US 2012/0082127 A1 Apr. 5, 2012

(51) Int. Cl.
*H04W 4/00* (2009.01)
(52) U.S. Cl.
USPC .......................................... 370/330
(58) Field of Classification Search
USPC .......................................... 370/330
See application file for complete search history.

(56) References Cited

U.S. PATENT DOCUMENTS

| | | |
|---|---|---|
| 2006/0239333 A1 | 10/2006 | Albert et al. |
| 2007/0014267 A1 | 1/2007 | Lam et al. |
| 2007/0171910 A1 | 7/2007 | Kumar |
| 2009/0016250 A1 | 1/2009 | Li et al. |
| 2009/0017851 A1 | 1/2009 | Li et al. |
| 2009/0323647 A1* | 12/2009 | Park et al. ............. 370/338 |
| 2012/0124231 A9* | 5/2012 | Richardson et al. ..... 709/229 |

FOREIGN PATENT DOCUMENTS

| | | |
|---|---|---|
| EP | 2104392 A2 | 9/2009 |
| WO | 0048367 A2 | 8/2000 |
| WO | 2009158637 A1 | 12/2009 |

OTHER PUBLICATIONS

International Search Report and Written Opinion—PCT/US2011/054808—ISA/EPO—Dec. 20, 2011.

* cited by examiner

*Primary Examiner* — Kenny Lin
(74) *Attorney, Agent, or Firm* — James K. O'Hare

(57) ABSTRACT

A method, an apparatus, and a computer program product for wireless communication are provided in which an identifier is sent in a peer discovery signal. In addition, a value is sent with the identifier in the peer discovery signal indicating at least one of a next time, a next frequency, or a next resource that the identifier will be sent. A method, an apparatus, and a computer program product for wireless communication are provided in which an identifier is received in a peer discovery signal. In addition, a value is received with the identifier in the peer discovery signal indicating at least one of a next time, a next frequency, or a next resource that the identifier should be expected to be received.

52 Claims, 11 Drawing Sheets

METHOD TO ENHANCE DISCOVERY OF IDENTIFIERS MULTIPLEXED IN A PEER-TO-PEER CHANNEL

BACKGROUND

1. Field

The present disclosure relates generally to communication systems, and more particularly, a method of enhancing discovery of identifiers multiplexed in a peer-to-peer channel.

2. Background

In a synchronous peer-to-peer communication system, a wireless communication device may need to multiplex multiple application identifiers and announce the identifiers in discrete time slots on a peer-to-peer channel. A method of enhancing the discovery of the identifiers multiplexed in the peer-to-peer channel is needed.

SUMMARY

In an aspect of the disclosure, a method, an apparatus, and a computer program product for wireless communication are provided in which an identifier is sent in a peer discovery signal. In addition, a value is sent with the identifier in the peer discovery signal indicating at least one of a next time, a next frequency, or a next resource that the identifier will be sent.

In an aspect of the disclosure, a method, an apparatus, and a computer program product for wireless communication are provided in which an identifier is received in a peer discovery signal. In addition, a value is received with the identifier in the peer discovery signal indicating at least one of a next time, a next frequency, or a next resource that the identifier should be expected to be received.

DETAILED DESCRIPTION

Figure 1:
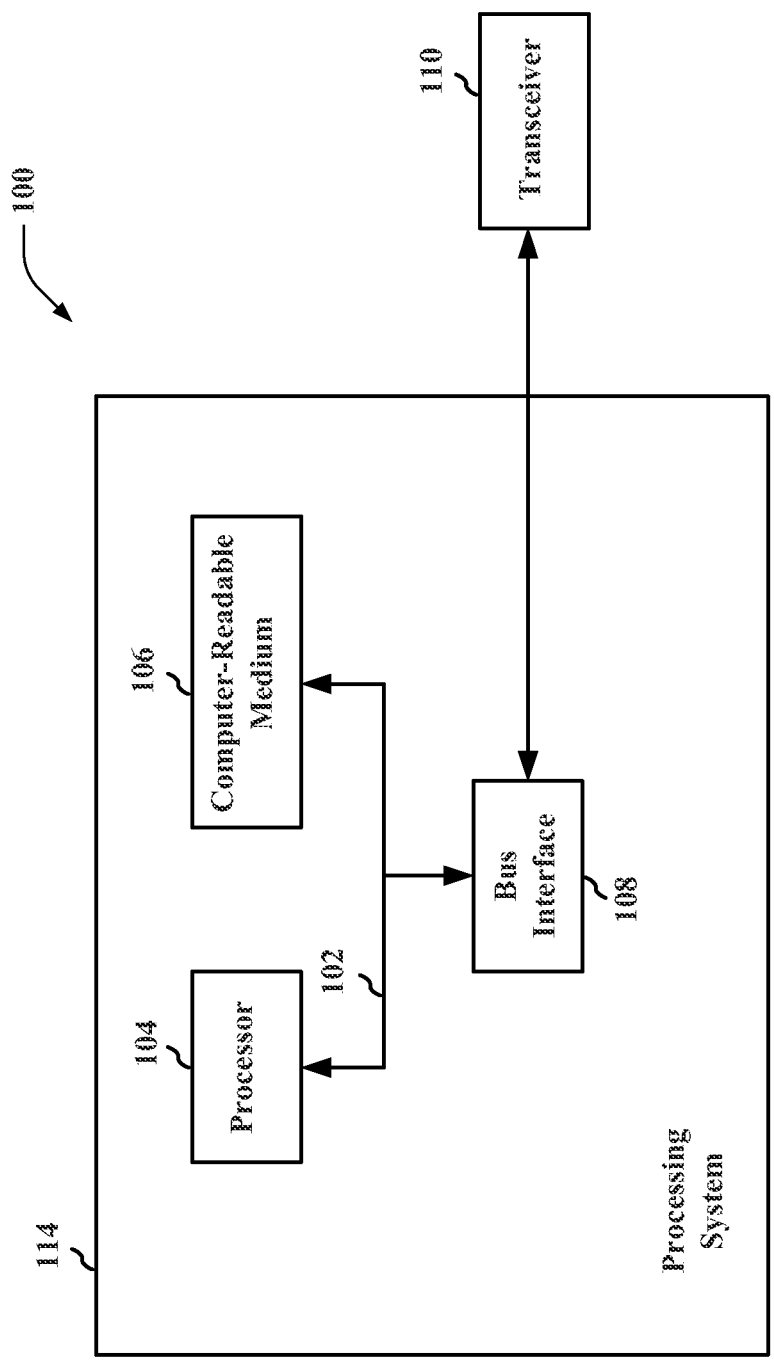
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
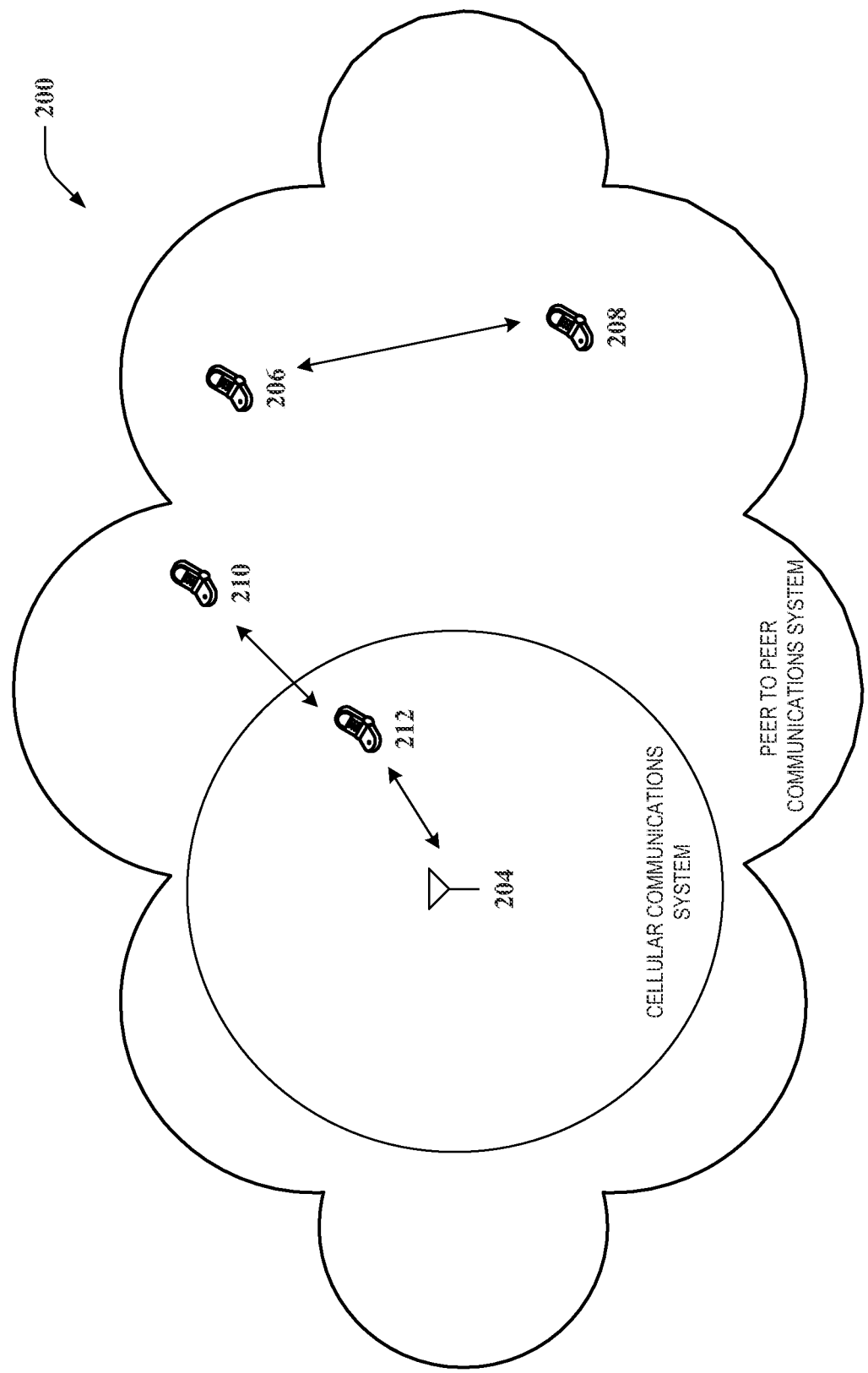
FIG. 2 is a drawing of an exemplary wireless peer-to-peer communications system.

FIG. 2 is a drawing of an exemplary peer-to-peer communications system 200. The peer-to-peer communications system 200 includes a plurality of wireless communication devices 206, 208, 210, 212. The peer-to-peer communications system 200 may overlap with a cellular communications system, such as for example, a wireless wide area network (WWAN). Some of the wireless communication devices 206, 208, 210, 212 may communicate together in peer-to-peer communication, some may communicate with the base station 204, and some may do both. For example, as shown in FIG. 2, the wireless communication devices 206, 208 are in peer-to-peer communication and the wireless communication devices 210, 212 are in peer-to-peer communication. The wireless communication device 212 is also communicating with the base station 204.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
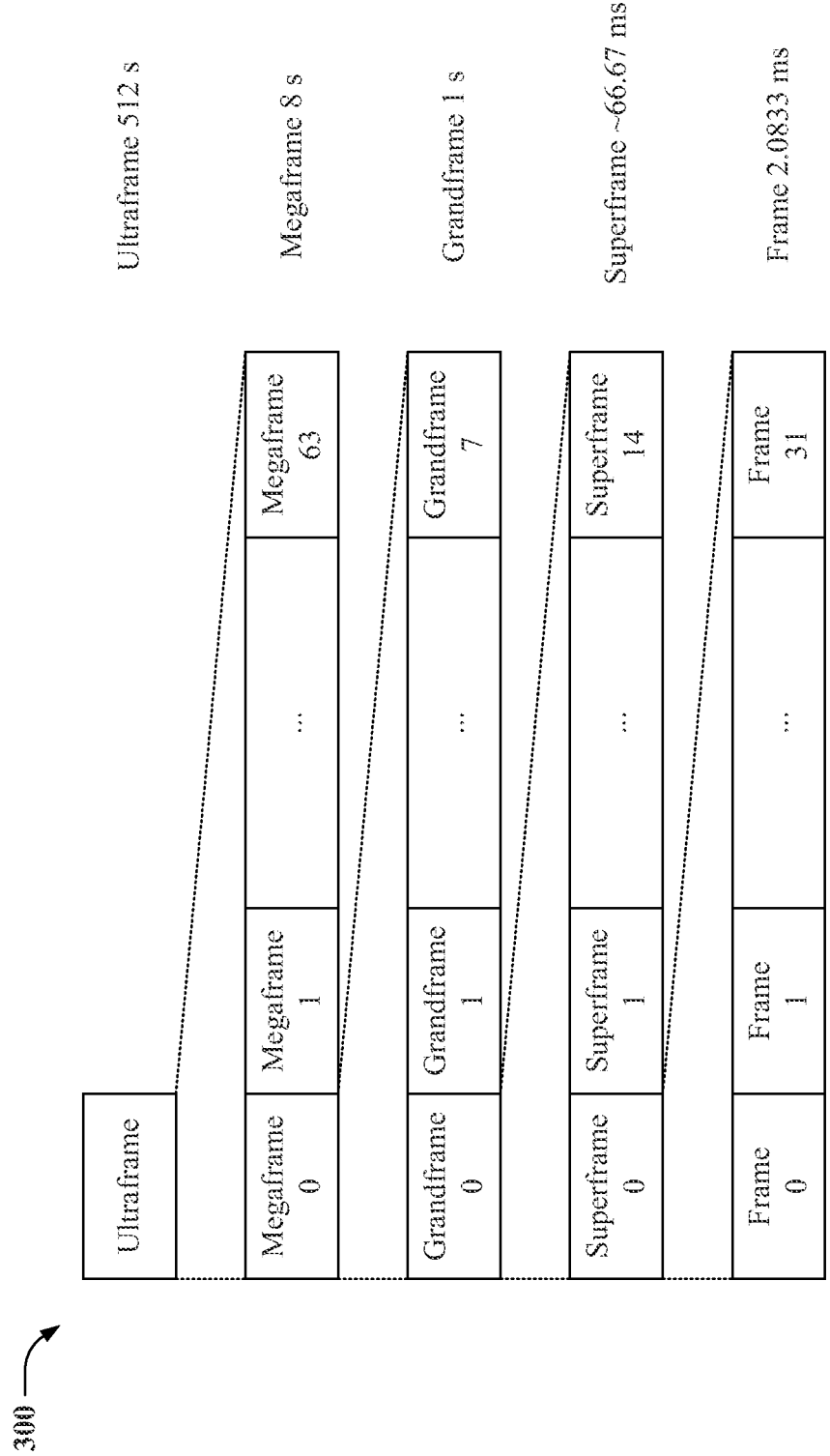
FIG. 3 is a diagram illustrating a time structure for peer-to-peer communication between the wireless communication devices.

FIG. 3 is a diagram 300 illustrating a time structure for peer-to-peer communication between the wireless communication devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
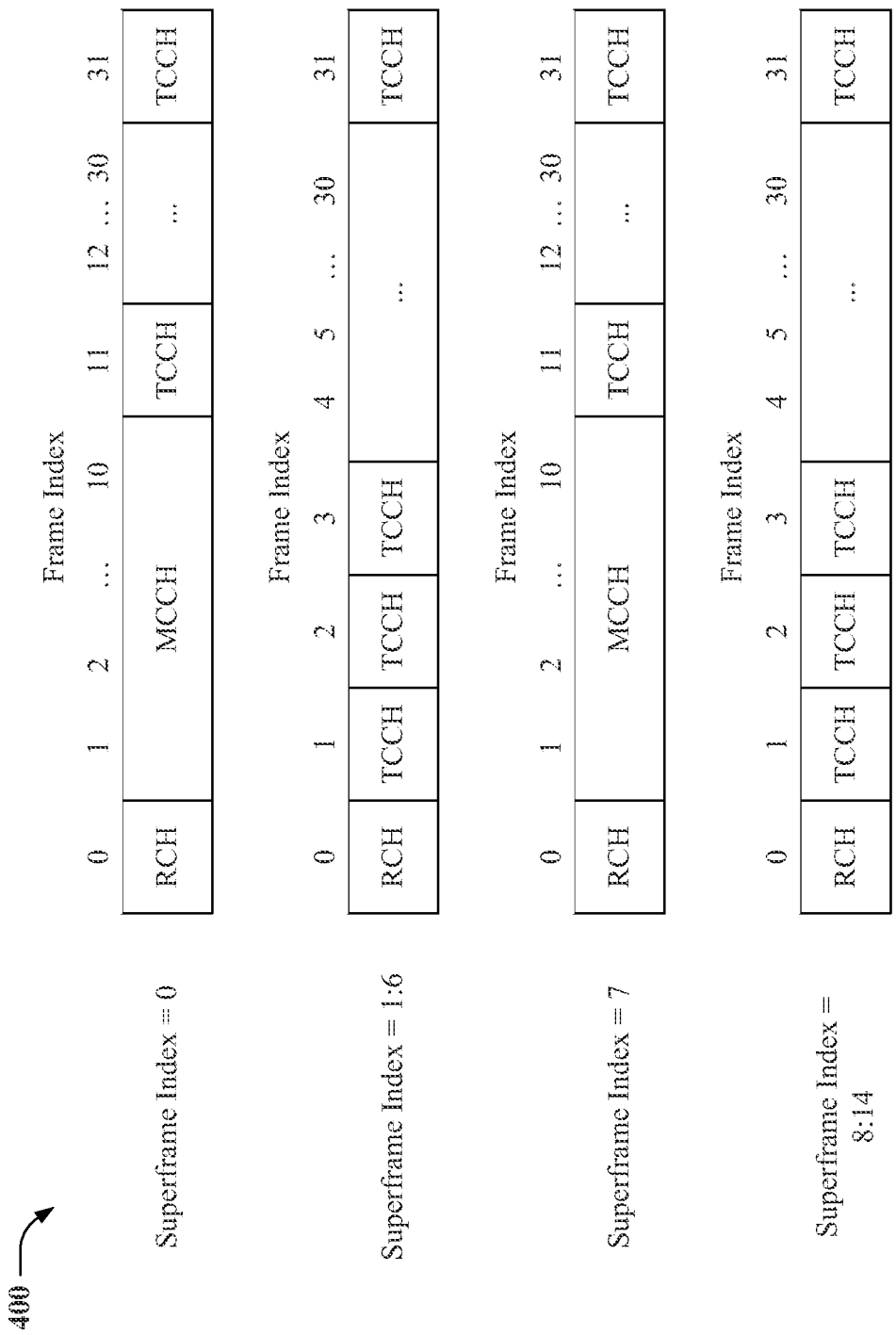
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
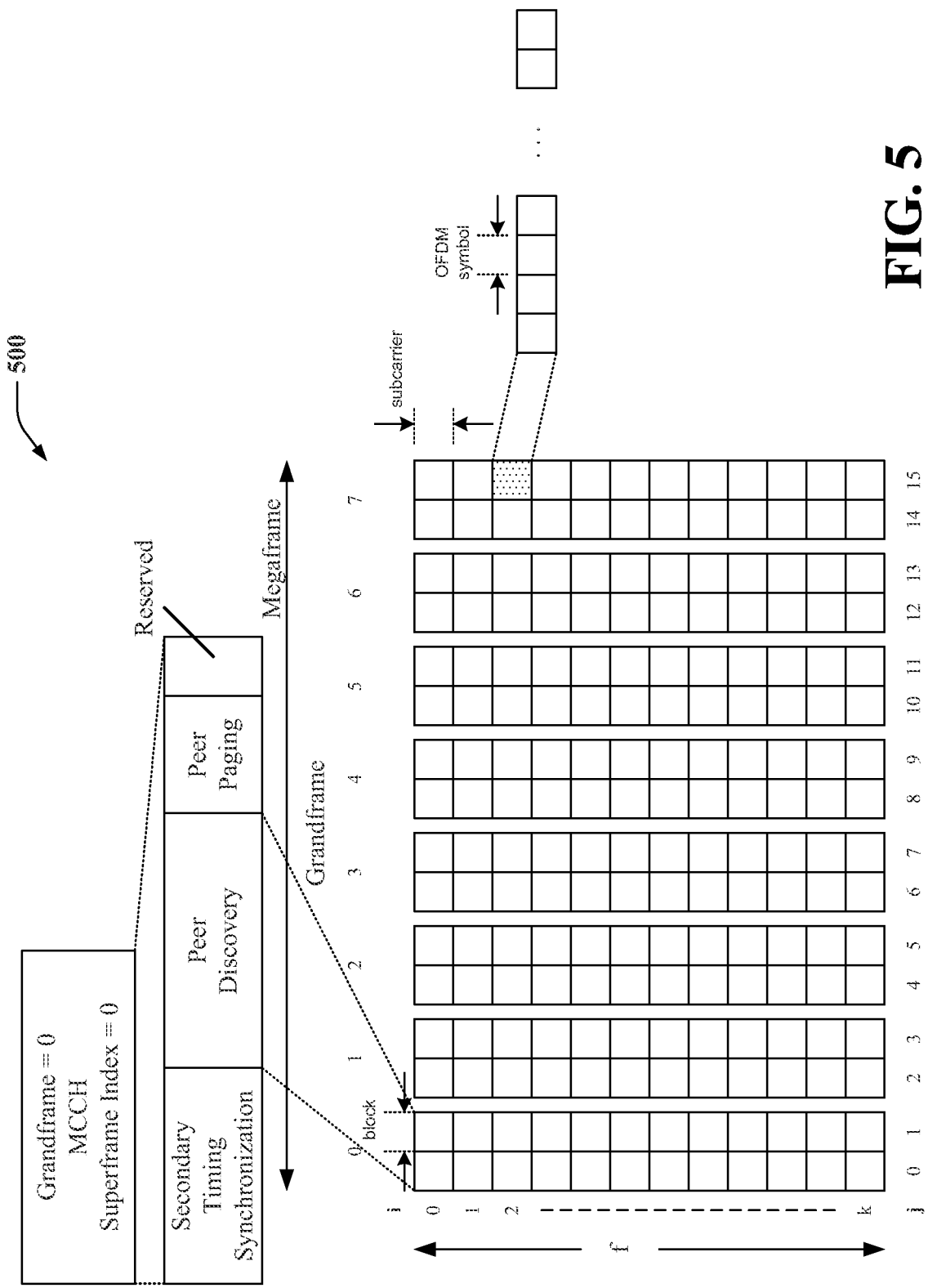
FIG. 5 is a diagram illustrating an operation timeline of a miscellaneous channel and an exemplary structure of a peer discovery channel.

FIG. 5 is a diagram 500 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency divisional multiplexing (OFDM) symbols at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Figure 6:
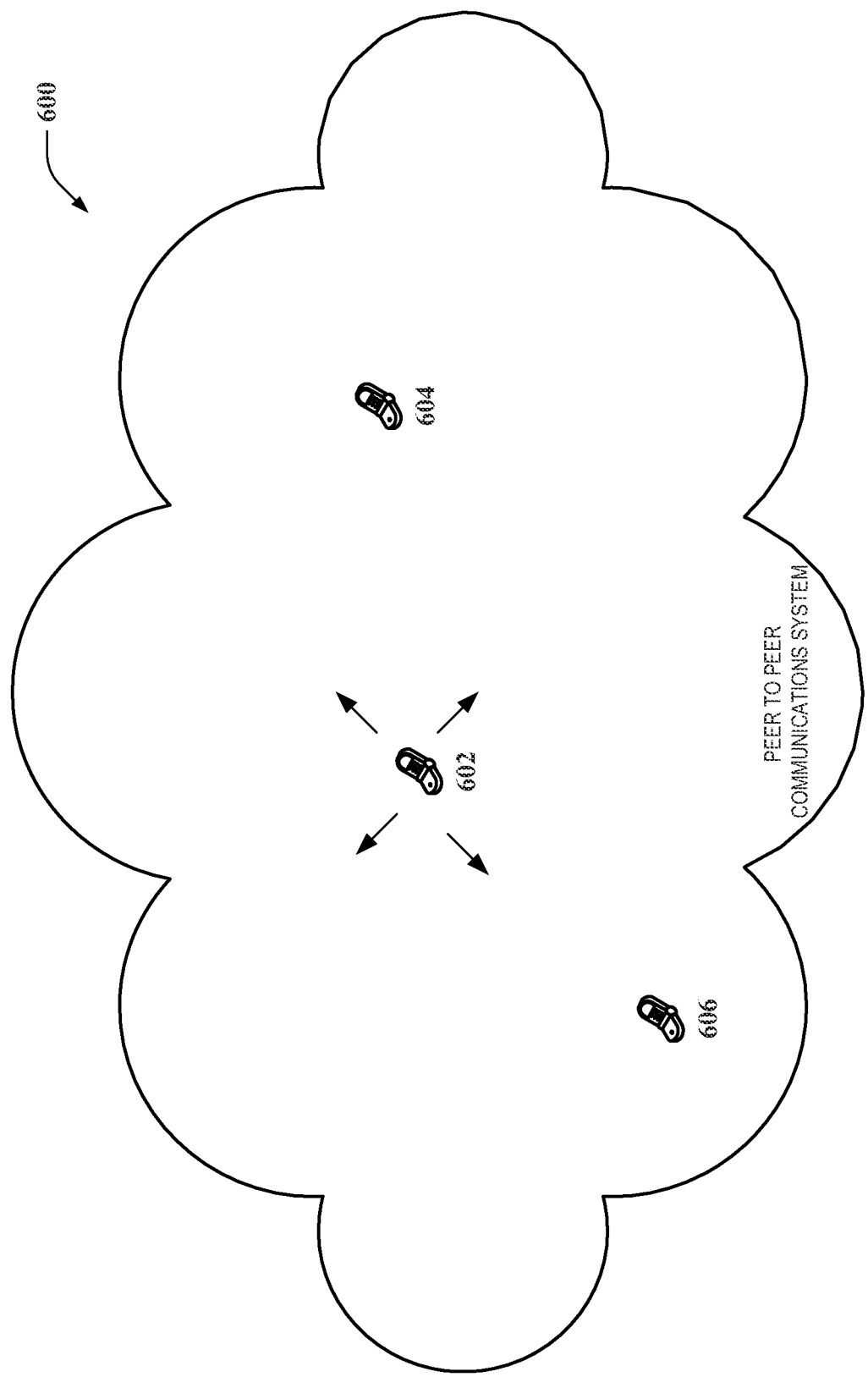
FIG. 6 is a diagram for illustrating an exemplary method for enhancing discovery of identifiers multiplexed in a peer-to-peer channel.

FIG. 6 is a diagram 600 for illustrating an exemplary method for enhancing discovery of identifiers multiplexed in a peer-to-peer channel. As shown in FIG. 6, the peer-to-peer communications system includes three wireless communication devices 602, 604, 606. The wireless communication device 602 broadcasts an application identifier (e.g., an expression, identity) in the peer discovery channel. In a synchronous peer-to-peer communication system, the wireless communication device 602 may need to multiplex multiple application identifiers and announce the identifiers in discrete time slots on the peer discovery channel. At each discrete time slot, the device may announce only one application identifier. Each application identifier should be announced repetitively to indicate its persistent existence. The contents of the sequential announcements of the same identifier may be identical or may be mathematically correlated to the same identifier. With regard to multiplexing the identifiers, other than in a default round-robin manner, the specific multiplexing scheme chosen by the wireless communication device 602 may be arbitrarily changed to favor one or more identifiers. The wireless communication device 602 may add or delete identifiers to be announced at any time. The aforementioned method of broadcasting application identifiers can cause difficulties for other wireless communication devices, as wireless communication devices receiving the broadcast may have difficulties tracking the application identifiers when identifier multiplexing information is not explicitly conveyed. For example, when the wireless communication device 602 stops announcing an application identifier, the wireless communication device 604 may not know for how long to listen before determining that a particular application identifier was lost. As such, the wireless communication device 604 may wait for longer than necessary to determine that a particular application identifier was lost, thus reducing the responsiveness of the peer-to-peer communications system.

In an exemplary method, in-band signaling is used to indicate and/or to hint the repeat pattern for each individual identifier. According to the exemplary method, when announcing each application identifier, the wireless communication device 602 also announces information of the next expected appearance of the application identifier. The information may be related to time, frequency, and/or a next resource. That is, the information may indicate a time such as the particular megaframe, a frequency such as the particular subcarrier, and/or a resource such as the particular block for the wireless communication device 604 to expect to receive the application identifier again. The hint information can be prepended, appended, or otherwise combined with the application identifier. The hint information may be used by the wireless communication device 604 to know beforehand the time, frequency, and/or resource of the next announcement that the identical identifier will likely appear.

Figure 7:
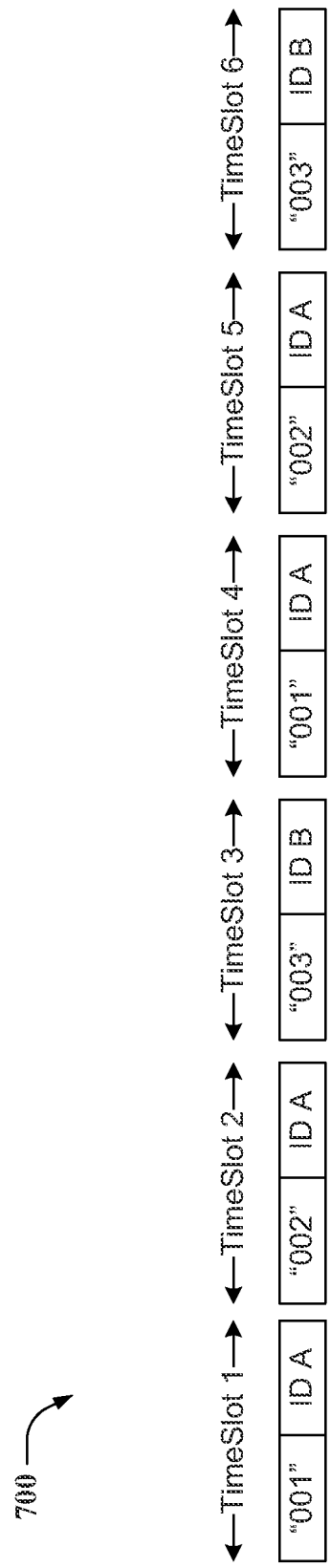
FIG. 7 is another diagram for illustrating an exemplary method for enhancing discovery of identifiers multiplexed in a peer discovery channel.

FIG. 7 is a diagram 700 for illustrating an exemplary method for enhancing discovery of identifiers multiplexed in a peer discovery channel. As discussed supra, inline signaling may be used to give hints regarding how application identifiers are multiplexed in the next few transmissions. As shown in FIG. 7, the hint information provides time information to indicate a next timeslot (e.g., a next megaframe) to expect identical peer discovery information, but as discussed supra, the hint information may alternatively or additionally indicate a next frequency/subcarrier and/or next resource to expect identical peer discovery information. As discussed supra, the peer discovery information includes an application identifier. The hint information may be carried by k bits, where each of the values represented by the bits may be defined as follows:

- "0": the application identifier announced in the current timeslot n will not be repeated. The receiving device can determine immediately that the application identifier will not be seen later.
- "1": the application identifier announced in the current timeslot n will be repeated in the timeslot n+1. The receiving device receives prior knowledge of the content of next timeslot, and will therefore be able to increase its responsiveness based on the prior knowledge.
- "2": the application identifier announced in the current timeslot n will be repeated in the timeslot n+2. The receiving device, if only interested in the particular identifier, can skip the next timeslot and listen to the following timeslot.
- Values between "2" and "$2^k-1$" are defined and interpreted correspondingly in a way similar to the value defined above.
- "$2^k-1$": the application identifier announced in the current timeslot n will be repeated in the timeslot $n+2^k-1$ or longer. The receiving device, if only interested in the particular identifier, can skip the next $2^k-2$ timeslots and listen to the timeslots thereafter.

An example best demonstrates the exemplary method. As shown in FIG. 7, in the first timeslot, the indicator "001" is broadcasted with the application identifier A to indicate that the application identifier A will appear in the next timeslot (i.e., the second timeslot). In the second timeslot, the indicator "002" is broadcasted with the application identifier A to indicate that the application identifier A will appear again in the fourth timeslot. In the third timeslot, the indicator "003" is broadcasted with the application identifier B to indicate that the application identifier B will appear again in the sixth timeslot. In the fourth timeslot, the indicator "001" is broadcasted with the application identifier A to indicate that the application identifier A will appear again in the fifth timeslot. In the fifth timeslot, the indicator "002" is broadcasted with the application identifier A to indicate that the application identifier A will appear again in the seventh timeslot.

A receiving device receives the broadcasted application identifiers and indicators. The receiving device may utilize the indicator information to improve its performance. For example, knowing when the application identifier should be announced again helps the receiving device's physical layer protocol utilize the incremental redundancy (soft-combining, joint decoding) in consecutive broadcasts of the same information to improve the accuracy and reliability of those announcements. In addition, knowing a priori the expected application identifier that will be announced at a certain time helps the receiving device to reduce the average computation overhead to interpret the announcements. Moreover, the a priori knowledge will allow the receiving device to process selective slots including particular identifiers and ignore non-relevant slots of other identifiers. Furthermore, the a priori knowledge may help the receiving device to determine and to track the appearance/disappearance of the application identifiers, and to infer the usage of the channel resource and to take advantage of the inferred information.

For example, the receiving device may set a timer to ascertain when a particular application identifier has disappeared. When the receiving device receives an indicator of "0," the receiving device will know immediately that a particular application identifier has disappeared without waiting for expiration of the timer. Further, the receiving device may be able to set the timer for less time than otherwise based on the received indicator for the particular application identifier. As such, the receiving device may set the timer to v*m*t, where v is the value/indicator, m is the number of timeslots to wait for the value/indicator, and t is the number of seconds between transmissions (e.g., length of time of a megaframe). For example, if the value/indicator is 1 and the length of time of a megaframe is 8 seconds, the receiving device may set the timer to 24 seconds such that an application identifier is determined to have disappeared after the receiving device does not receive the application identifier three consecutive times.

Figure 8:
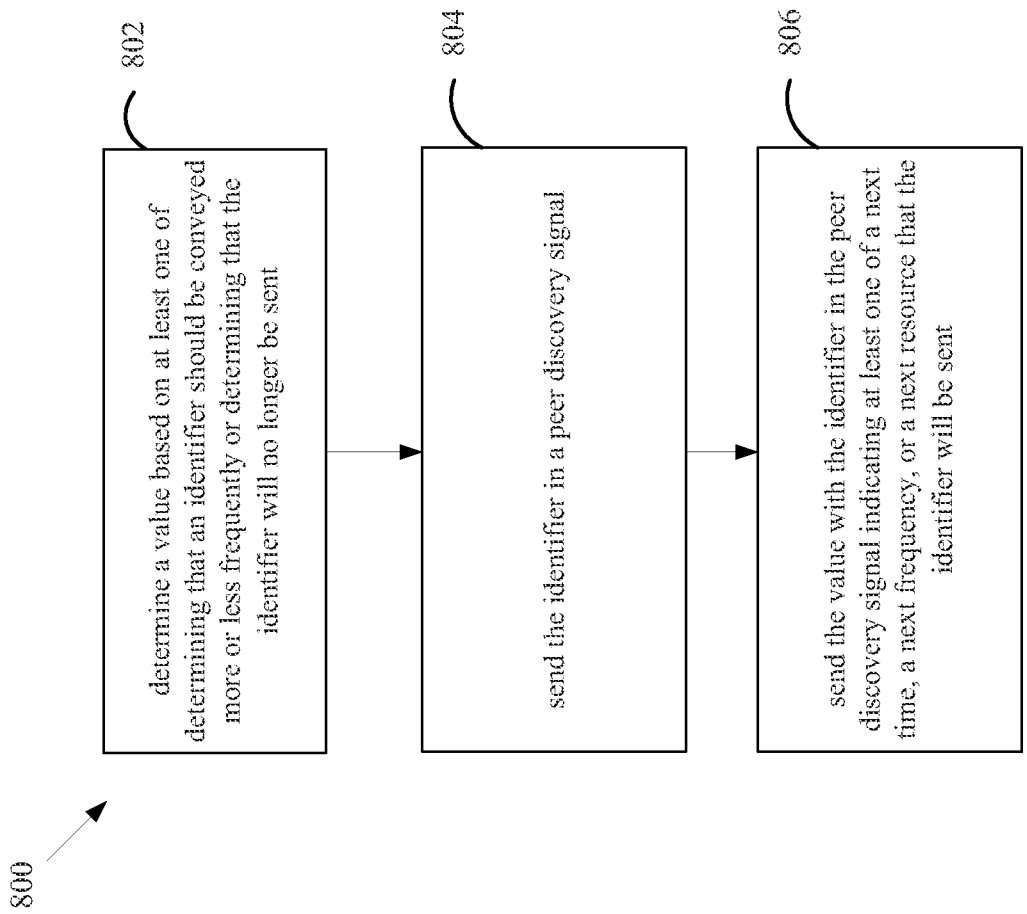
FIG. 8 is a flow chart of a first method of wireless communication.

FIG. 8 is a flow chart 800 of a first exemplary method. The method is performed by a wireless communication device. As shown in FIG. 8, the wireless device may determine a value based on at least one of determining that an identifier should be conveyed more or less frequently or determining that the identifier will no longer be sent (802). In addition, the wireless device sends an identifier in a peer discovery signal (804) and sends a value with the identifier in the peer discovery signal indicating at least one of a next time, a next frequency, or a next resource that the identifier will be sent (806). The value may indicate the next time that the identifier will be sent. In such a configuration, the frequency (or subcarrier) is implied. The value may indicate a frequency that the identifier will be sent. In such a configuration, the time (or timeslot) is implied. The value may be one value for conveying one of a time or a frequency or two values conveying both time and frequency. The value may indicate a relative offset of a resource (e.g., transmission opportunity, a time and/or frequency/subcarrier) that the identifier will be sent again as compared to a current resource used to send the value and the identifier in a current transmission. The identifier may be based on a unique expression. That is, the identifier may be the expression or may be a modification of the expression, such as a hash, time-varying hash, transformation, encryption, compression, or time-varying compression of the expression.

Figure 9:
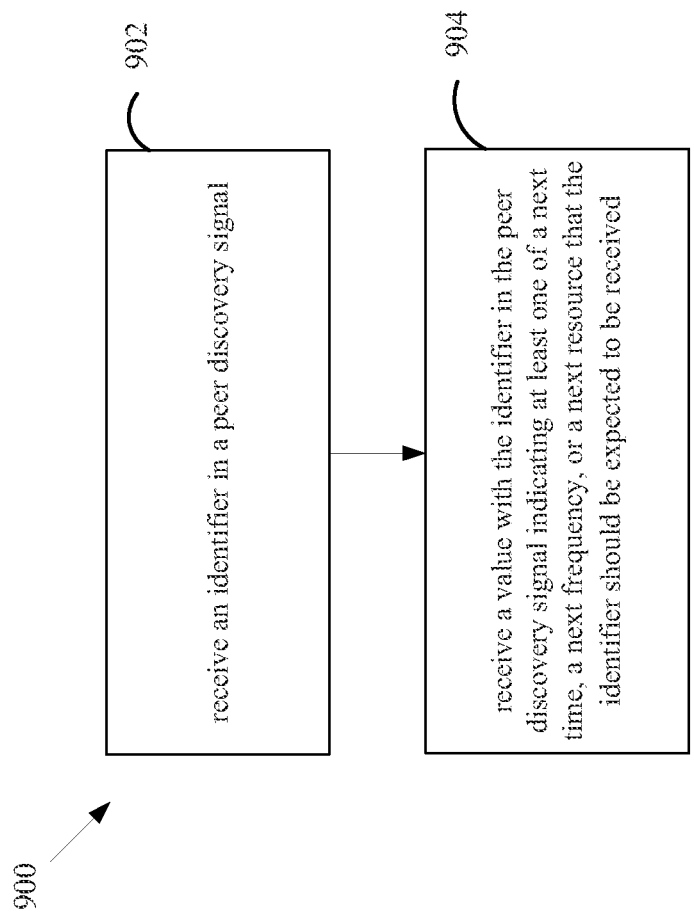
FIG. 9 is a flow chart of a second method of wireless communication.

FIG. 9 is a flow chart 900 of a first exemplary method. The method is performed by a wireless communication device. As shown in FIG. 9, the wireless device receives an identifier in a peer discovery signal (902) and receives a value with the identifier in the peer discovery signal indicating at least one of a next time, a next frequency, or a next resource that the identifier should be expected to be received (904). The value may indicate the next time that the identifier should be expected to be received. The value may indicate a frequency that the identifier should be expected to be received. The value may be one value for conveying one of a time or a frequency or two values conveying both time and frequency. The value may indicate a relative offset of a resource that the identifier should be expected to be received again as compared to a current resource used to receive the value and the identifier. The identifier may be based on a unique expression.

Figure 10:
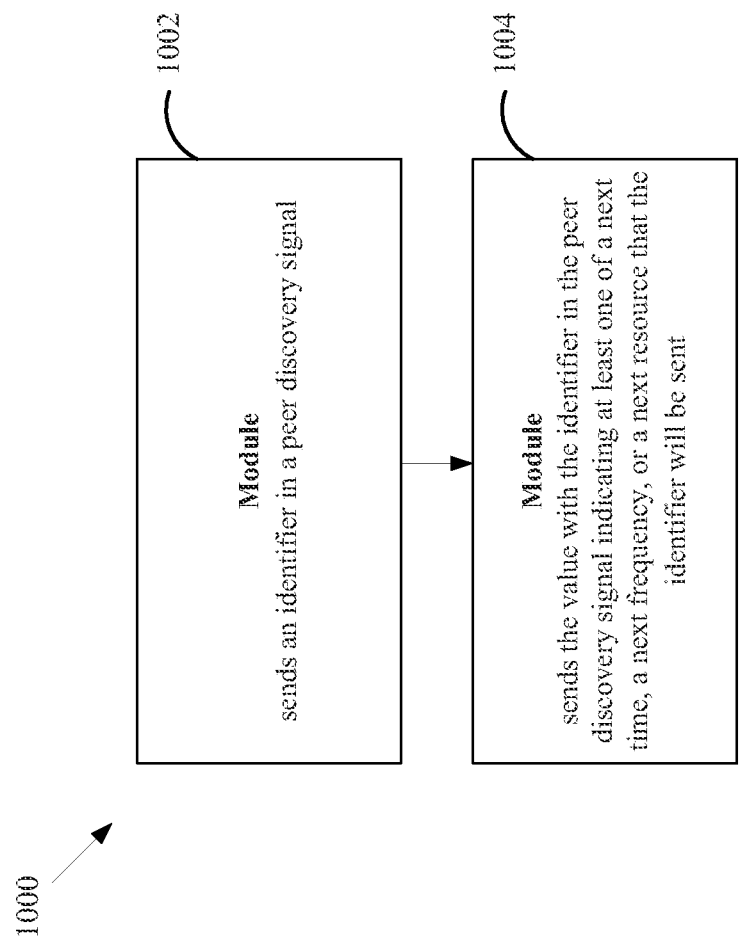
FIG. 10 is a conceptual block diagram illustrating the functionality of a first exemplary apparatus.

FIG. 10 is a conceptual block diagram 1000 illustrating the functionality of an exemplary apparatus 100. The apparatus 100 includes a module 1002 that sends an identifier in a peer discovery signal and a module 1004 that sends a value with the identifier in the peer discovery signal indicating at least one of a next time, a next frequency, or a next resource that the identifier will be sent.

Figure 11:
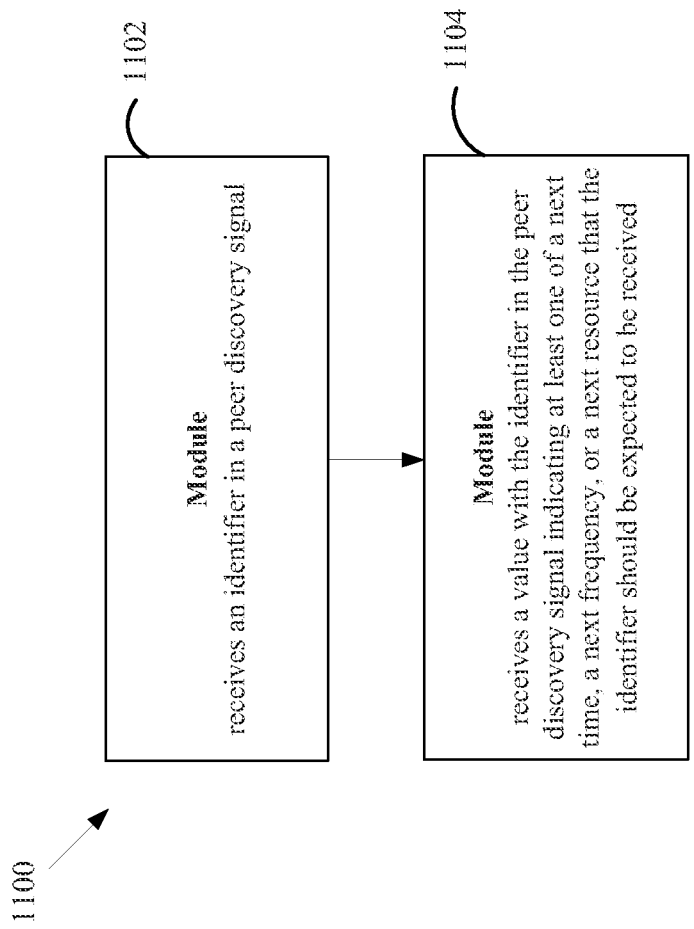
FIG. 11 is a conceptual block diagram illustrating the functionality of a second exemplary apparatus.

FIG. 11 is a conceptual block diagram 1100 illustrating the functionality of an exemplary apparatus 100. The apparatus 100 includes a module 1102 that receives an identifier in a peer discovery signal and a module 1104 that receives a value with the identifier in the peer discovery signal indicating at least one of a next time, a next frequency, or a next resource that the identifier should be expected to be received.

Referring to FIG. 1, in one configuration, the apparatus 100 for wireless communication includes means for sending an identifier in a peer discovery signal and means for sending a value with the identifier in the peer discovery signal indicating at least one of a next time, a next frequency, or a next resource that the identifier will be sent. The apparatus 100 may further include means for determining the value based on at least one of determining that the identifier should be conveyed more or less frequently or determining that the identifier will no longer be sent. The aforementioned means is the processing system 114 configured to perform the functions recited by the aforementioned means.

In another configuration, the apparatus 100 for wireless communication includes means for receiving an identifier in a peer discovery signal and means for receiving a value with the identifier in the peer discovery signal indicating at least one of a next time, a next frequency, or a next resource that the identifier should be expected to be received. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   sending an identifier in a peer discovery signal; and
   sending a value with the identifier in the peer discovery signal, the value indicating at least one of a time, a frequency, or a resource that a repeated identifier will be sent,
   wherein the identifier and the repeated identifier are identical.

2. The method of claim 1, wherein the value indicates the time that the repeated identifier will be sent.

3. The method of claim 1, wherein the value indicates the frequency that the repeated identifier will be sent.

4. The method of claim 1, wherein the value is one value for conveying one of the time or the frequency or two values conveying both the time and the frequency.

5. The method of claim 1, wherein the value indicates a relative offset of the resource that the repeated identifier will be sent as compared to a current resource used to send the value and the identifier.

6. The method of claim 1, wherein the identifier is based on a unique expression.

7. The method of claim 1, further comprising determining the value based on at least one of determining that the identifier should be conveyed more or less frequently or determining that the identifier will no longer be sent.

8. A method of wireless communication, comprising:
   receiving an identifier in a peer discovery signal; and
   receiving a value with the identifier in the peer discovery signal, the value indicating at least one of a time, a frequency, or a resource that a repeated identifier is expected to be received,
   wherein the identifier and the repeated identifier are identical.

9. The method of claim 8, wherein the value indicates the time that the repeated identifier is expected to be received.

10. The method of claim 8, wherein the value indicates the frequency that the subsequent identifier is expected to be received.

11. The method of claim 8, wherein the value is one value for conveying one of the time or the frequency or two values conveying both the time and the frequency.

12. The method of claim 8, wherein the value indicates a relative offset of the resource that the repeated identifier is expected to be received as compared to a current resource used to receive the value and the identifier.

13. The method of claim 8, wherein the identifier is based on a unique expression.

14. An apparatus for wireless communication, comprising:
means for sending an identifier in a peer discovery signal; and
means for sending a value with the identifier in the peer discovery signal, the value indicating at least one of a time, a frequency, or a resource that a repeated identifier will be sent,
wherein the identifier and the repeated identifier are identical.

15. The apparatus of claim 14, wherein the value indicates the time that the repeated identifier will be sent.

16. The apparatus of claim 14, wherein the value indicates the frequency that the repeated identifier will be sent.

17. The apparatus of claim 14, wherein the value is one value for conveying one of the time or the frequency or two values conveying both the time and the frequency.

18. The apparatus of claim 14, wherein the value indicates a relative offset of the resource that the repeated identifier will be sent as compared to a current resource used to send the value and the identifier.

19. The apparatus of claim 14, wherein the identifier is based on a unique expression.

20. The apparatus of claim 14, further comprising means for determining the value based on at least one of determining that the identifier should be conveyed more or less frequently or determining that the identifier will no longer be sent.

21. An apparatus for wireless communication, comprising:
means for receiving an identifier in a peer discovery signal; and
means for receiving a value with the identifier in the peer discovery signal, the value indicating at least one of a time, a frequency, or a resource that a repeated identifier is expected to be received,
wherein the identifier and the repeated identifier are identical same.

22. The apparatus of claim 21, wherein the value indicates the time that the repeated identifier is expected to be received.

23. The apparatus of claim 21, wherein the value indicates the frequency that the repeated identifier is expected to be received.

24. The apparatus of claim 21, wherein the value is one value for conveying one of the time or the frequency or two values conveying both the time and the frequency.

25. The apparatus of claim 21, wherein the value indicates a relative offset of the resource that the repeated identifier is expected to be received as compared to a current resource used to receive the value and the identifier.

26. The apparatus of claim 21, wherein the identifier is based on a unique expression.

27. A computer program product for wireless communication, comprising:
a non-transitory computer-readable medium comprising code for:
sending an identifier in a peer discovery signal; and
sending a value with the identifier in the peer discovery signal, the value indicating at least one of a time, a frequency, or a resource that a repeated identifier will be sent,
wherein the identifier and the repeated identifier are identical.

28. The computer program product of claim 27, wherein the value indicates the time that the repeated identifier will be sent.

29. The computer program product of claim 27, wherein the value indicates the frequency that the repeated identifier will be sent.

30. The computer program product of claim 27, wherein the value is one value for conveying one of the time or the frequency or two values conveying both the time and the frequency.

31. The computer program product of claim 27, wherein the value indicates a relative offset of the resource that the repeated identifier will be sent as compared to a current resource used to send the value and the identifier.

32. The computer program product of claim 27, wherein the identifier is based on a unique expression.

33. The computer program product of claim 27, wherein the non-transitory computer-readable medium further comprises code for determining the value based on at least one of determining that the identifier should be conveyed more or less frequently or determining that the identifier will no longer be sent.

34. A computer program product for wireless communication, comprising:
a non-transitory computer-readable medium comprising code for:
receiving an identifier in a peer discovery signal; and
receiving a value with the identifier in the peer discovery signal, the value indicating at least one of a time, a frequency, or a resource that a repeated identifier is expected to be received,
wherein the identifier and the repeated identifier are identical.

35. The computer program product of claim 34, wherein the value indicates the time that the repeated identifier is expected to be received.

36. The computer program product of claim 34, wherein the value indicates the frequency that the repeated identifier is expected to be received.

37. The computer program product of claim 34, wherein the value is one value for conveying one of the time or the frequency or two values conveying both the time and the frequency.

38. The computer program product of claim 34, wherein the value indicates a relative offset of the resource that the repeated identifier is expected to be received as compared to a current resource used to receive the value and the identifier.

39. The computer program product of claim 34, wherein the identifier is based on a unique expression.

40. An apparatus for wireless communication, comprising:
a processing system configured to:
send an identifier in a peer discovery signal; and
send a value with the identifier in the peer discovery signal, the value indicating at least one of a time, a frequency, or a resource that a repeated identifier will be sent,
wherein the identifier and the repeated identifier are identical.

41. The apparatus of claim 40, wherein the value indicates the time that the repeated identifier will be sent.

42. The apparatus of claim 40, wherein the value indicates the frequency that the repeated identifier will be sent.

43. The apparatus of claim 40, wherein the value is one value for conveying one of the time or the frequency or two values conveying both the time and the frequency.

44. The apparatus of claim 40, wherein the value indicates a relative offset of the resource that the repeated identifier will be sent as compared to a current resource used to send the value and the identifier.

45. The apparatus of claim 40, wherein the identifier is based on a unique expression.

46. The apparatus of claim 40, wherein the processing system is further configured to determine the value based on at least one of determining that the identifier should be conveyed more or less frequently or determining that the identifier will no longer be sent.

47. An apparatus for wireless communication, comprising:
a processing system configured to:
receive an identifier in a peer discovery signal; and
receive a value with the identifier in the peer discovery signal, the value indicating at least one of a time, a frequency, or a resource that a repeated identifier is expected to be received,
wherein the identifier and the repeated identifier are identical.

48. The apparatus of claim 47, wherein the value indicates the time that the repeated identifier is expected to be received.

49. The apparatus of claim 47, wherein the value indicates the frequency that the repeated identifier is expected to be received.

50. The apparatus of claim 47, wherein the value is one value for conveying one of the time or the frequency or two values conveying both the time and the frequency.

51. The apparatus of claim 47, wherein the value indicates a relative offset of the resource that the repeated identifier is expected to be received as compared to a current resource used to receive the value and the identifier.

52. The apparatus of claim 47, wherein the identifier is based on a unique expression.

* * * * *